United States Patent Office 3,036,492
Patented May 29, 1962

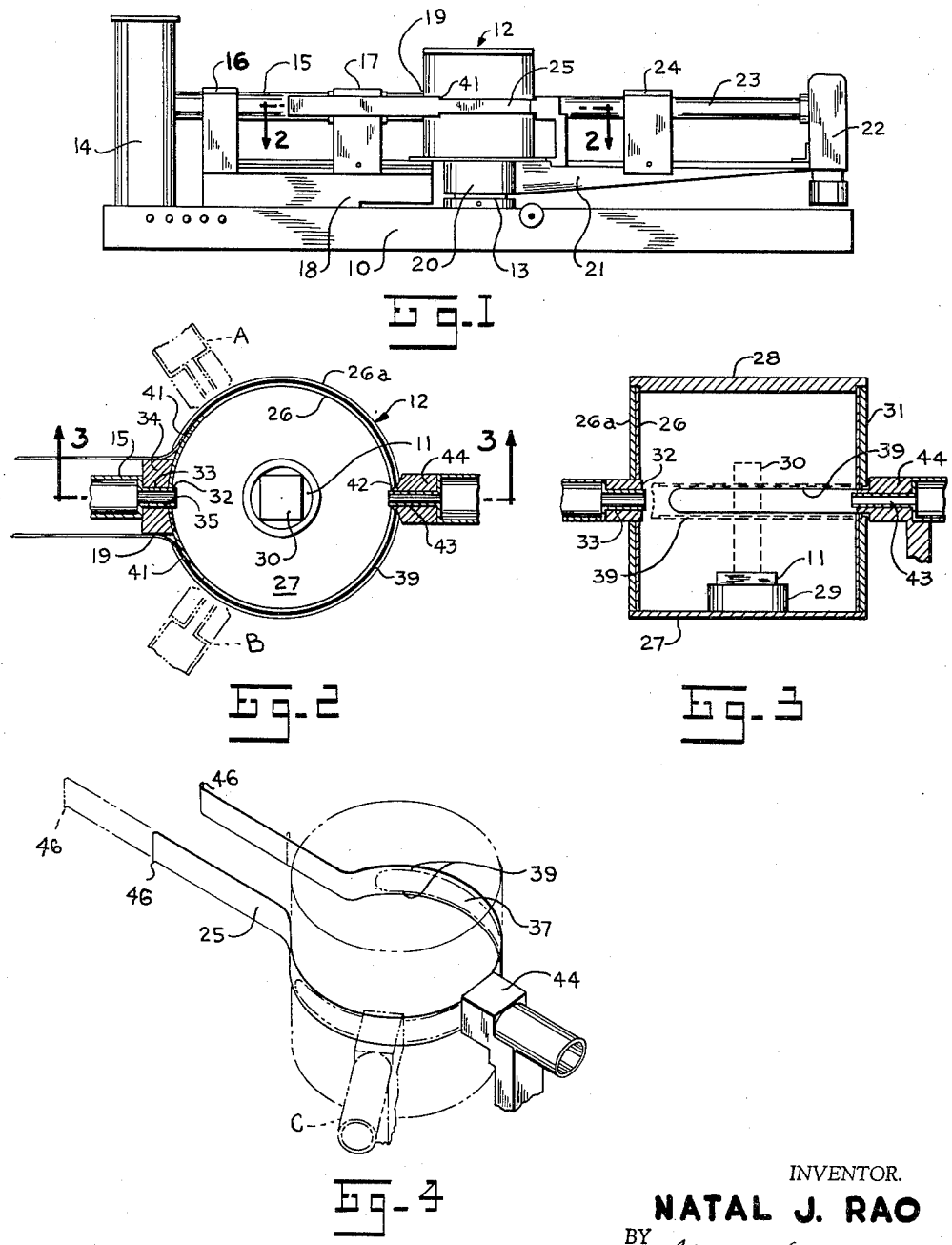

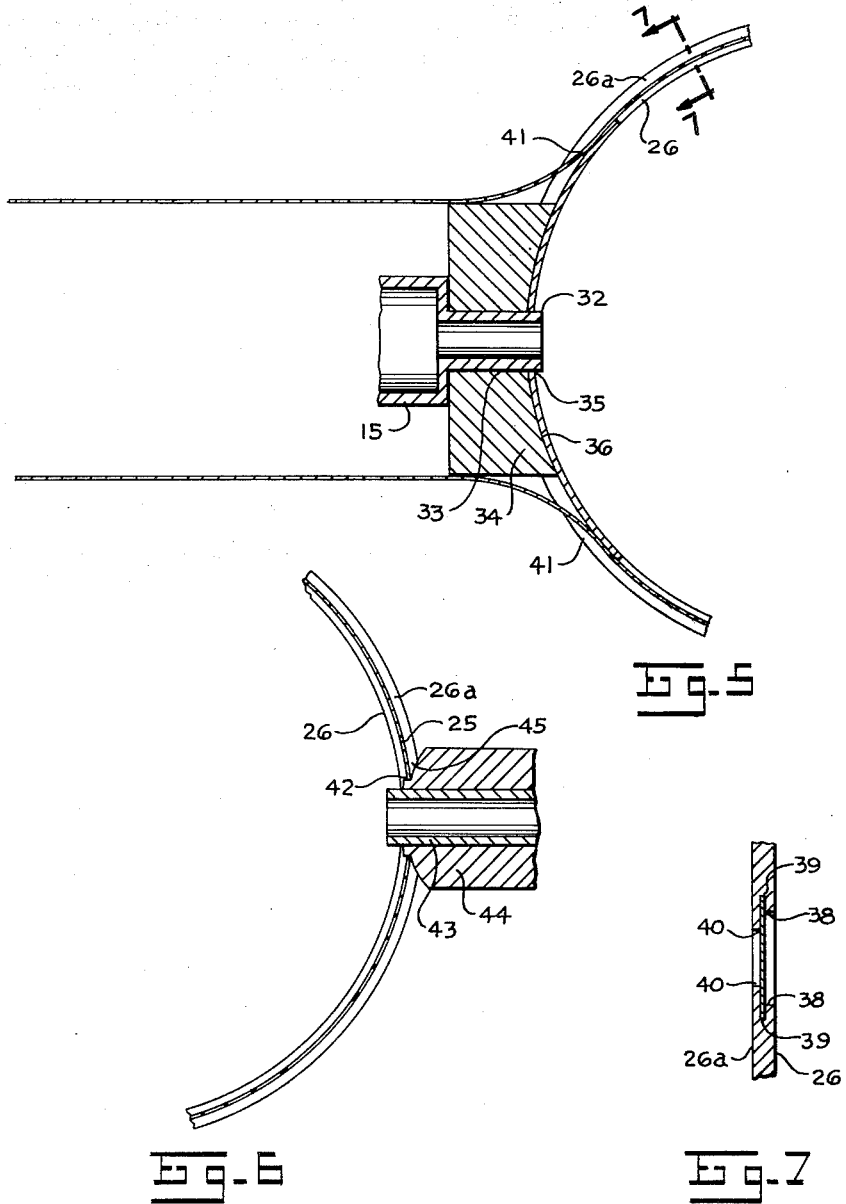

3,036,492
ADJUSTABLE SPECIMEN CHAMBER
Natal J. Rao, 245 Washington Ave., Brooklyn, N.Y.
Filed Dec. 23, 1958, Ser. No. 782,533
9 Claims. (Cl. 88—14)

This invention relates to shielded chambers and more particularly to specimen chambers for use with optical equipment.

In many forms of equipment used to measure light or other radiant energy it is desirable and frequently imperative that portions of the apparatus be shielded or isolated from the surrounding environment. For example, in a device for measuring light scattering effects of various materials wherein the apparatus comprises a light source, a specimen holder, and a light intensity measuring device, it is necessary to exclude all external sources of light in order to obtain accurate measurements. While this may be done by placing the entire apparatus in an enclosure or a dark room it would be more conveniently done by the use of a suitable chamber for the specimen under examination which is made a portion of the apparatus. In the case of a light scattering device, the amount of light scattered by the specimen at various angles is required to be measured and, as a consequence, it is necessary that such chamber permit relative angular displacement of the light source and light intensity measuring device with respect to each other. This scanning situation is common to a number of instruments and hence it is an object of this invention to provide an angularly adjustable light tight chamber suitable for making optical or similar measurements.

It is another object of this invention to provide a specimen chamber that has entry and exit apertures which may be angularly positioned with respect to each other over an included angle of over three-fourths of a complete circular arc without disturbing the shielding characteristics of the chamber.

It is still another object of this invention to provide a chamber in which an aperture may be angularly located with respect to the chamber at any point in the adjustment range and, in fact, can be capable of being continuously varied over the full range of angular adjustment without violating the light tightness of the chamber at any time.

It is a further object of this invention to provide an angularly adjustable chamber in which the accessory devices are outside of the chamber to permit adjustment of these accessory devices without violating the shielded condition of the chamber while providing required exit and entry apertures.

It is yet another object of this invention to provide an adjustable chamber arrangement with limited access points which can be made compact and is capable of adaptation to a wide variety of instruments.

Other objects and advantages of the invention will be revealed as the invention is described in more detail hereinafter.

For purposes of illustration of the invention it will be described in conjunction with a light scattering device although it is apparent and will become more obvious that the invention can be used in conjunction with a variety of different devices.

FIGURE 1 is a side elevational view of the invention as embodied in a light scattering measurement apparatus;

FIGURE 2 is a section of the apparatus along line 2—2 showing the internal arrangement of the parts within the chamber surrounding the specimen holder;

FIGURE 3 is a section of the apparatus along line 3—3;

FIGURE 4 is a skeletal perspective view showing the details of the portion of the chamber which permits the angular position of the two access apertures with respect to each other;

FIGURE 5 is an enlarged view of the entry aperture portion of the apparatus;

FIGURE 6 is an enlarged view of the exit aperture portion of the apparatus; and

FIGURE 7 is a sectional view along line 7—7 of FIGURE 5.

In the accompanying drawings FIGURES 1, 2 and 3 show a light scattering apparatus comprising a light source which directs a beam of light at the specimen contained in a suitable specimen holder and a light sensing device capable of being oriented at any angle with respect to the incoming beam of light. The measurement is made by positioning the light sensing element at various angles with respect to the incoming light beam and reading the intensity of scattered light.

The light scattering device comprises a base member 10 to which is attached at the central portion thereof a specimen holder 11 contained in the chamber indicated generally by the numeral 12 by means of the post 13. At one end of the base member 10 is attached a lamp housing 14 which is connected with the chamber 12 by means of a tubular member 15 supported by the stanchions 16 and 17 resting on the raised portion 18 of the base 12. The tubular member 15 may contain such optical elements as are required to produce a collimated beam of light entering the apparatus at the entrance aperture 19. About the post 13 is the collar 20 to which is attached the arm 21 supporting the light sensing device 22 which is connected to the chamber 12 by means of the exit tube 23. The exit tube 23 is supported on the arm 21 by means of the support stanchion 24 and is connected to the slidable element 25 of the chamber 12.

The chamber 12 is a substantially cylindrical unit comprising an inner cylindrical member 26 and outer cylindrical member 26a fitted tightly around the inner cylindrical member 26, a circular bottom wall 27 and a removable circular top cover 28. The chamber bottom wall 27 has attached thereto the specimen holder 11 resting on the extension 29 of the post 13 into which the specimen 30 may be mounted. The cylindrical wall assembly 31 comprising the inner cylindrical member 26 and the outer cylindrical member 26a has an aperture 32 therein adapted to receive the restricted end 33 of the tubular member 15 by means of the adapter member 34 having an opening 35 therein to match the reduced diameter end 33 of the tubular member 15. The adapter member 34 may be secured to the wall 31 by any convenient means such as welding or cementing. The cylindrical wall assembly 31 has an elongated circumferentially extending slot 37 formed therethrough, the inner edge 38 and the outer edge 40 of which form channels 39 which act as a way to guide the tractable spring member 25 in its movement around the periphery of the chamber 12. The arrangement of the inner and outer cylinder walls 26 and 26a provides a convenient arrangement for forming the slot and channels. The circumferential channels 39 which guide the tractable sliding spring member 25 around the periphery of the chamber are terminated by the slits 41 which permit the sliding tractable spring member to be displaced from its circumferential path and pass from the cylinder wall to each side of the tubular member 15 which connects the lamp housing 14 with the chamber 12 as the arm 21 is rotated about the post 13 to bring the light sensing device to various angles with respect to the light source comprising the lamp housing 14 and the tubular member 15 with its contained elements. The tractable sliding spring element has an aperture 42 therein adapted to receive the end 43 of the tubular member 23 connecting the chamber 12 with the light sensing device 22 by means of the adapter element 44. The inner edges 38 of the slot 37 are closer spaced than the outer edges 40 of the slot 37 to permit the tapered nose 45 of the adapter 44 to be as close to the chamber 12 as possible to prevent the leakage of light into the chamber 12. The combination of the channel ways 39 and the slits 41 make the joint between the tractable sliding spring member 25 and the chamber 12 light tight. The tractable sliding spring member 25 is bent at the ends 46 to prevent the ends of the member from entering the slot 37 and admitting light to the apparatus. The ends 46 are also necessary to prevent interference with the operation of the sliding spring member since it would be difficult to have the ends of the spring member move past the adapter member 34 if the ends of the tractable spring member 25 were left sharp.

For the device described, the chamber 12 may be conveniently made of either metal or a suitable plastic material which is opaque to light. The tractable sliding spring member 25 may be advantageously made of spring steel, Phosphor bronze, beryllium copper or any other suitable spring material. The chamber 12 and the inner surface of the tractable member may be advantageously coated with a black non-reflecting coating to reduce the possibility of extraneous radiation entering the light sensing device 22.

While the light scattering device described in detail above reveals the manner in which the invention may be applied, a number of departures in construction are possible which extend the usefulness of the invention and permit its application to other types of measuring instruments. In essentially the form described above the invention may be applied to spectral reflectance measuring devices, to luminescence and fluorescence measurements, to measurements of transmittance and reflectance at various angles, to measurements of the light polarization properties of various materials and specimens, and in general to any device for making photometric measurements where goniometric data are either necessary or desirable. The chamber is as shown in the drawings but the auxiliary sources of light and detectors are selected as required by the specific measurement to be made.

The chamber can be used for goniometric measurement of intensity of other types of radiant or corpuscular energy. By making the chamber of a dense metal such as lead and by adding articulated sections of a similar material to the tractable sliding spring member 25 so that it has the same transmission characteristics as the chamber, it can be used for X-ray diffraction and refraction measurements. It can also be used to determine the distribution of primary or secondary radiation from a sample contained in the chamber. If the chamber is further modified by either placing it in toto in a vacuum or by making the seals such that it can be evacuated it could also be used to make electron diffraction measurements, in fact many similar types of radiation interaction measurements including molecular beam measurements.

It is obvious that infra red radiant energy measurements can also be made provided that the chamber be made of a good infra red absorbing material such as plastics loaded with carbon black.

The invention has been shown in a manner to indicate that the sample is irradiated from a fixed direction and examined from various directions with respect to the irradiation direction. It is evident that the source and sensing element may be interchanged so that the sample may be irradiated from various angles and the energy sensed from a single fixed direction and such an arrangement may be advantageously used in certain types of measurements, for example in diffraction apparati.

One important feature of the invention is the fact that the two apertures may be moved over an angular span in excess of 270° permitting measurements of back scattered radiation as well as forward directed energy. This permits of acquiring data over a sufficiently greater angle than conventional devices that it lends additional utility to any equipment equipped with the chamber.

As the exit tube 23 and its associated device is swung about the axis of the chamber 12, the end of tubular member 43 carries the tractable spring member 25 with it. Said spring member 25 slides in the channel and maintains the light tight condition of the chamber for all angular positions of the exit tube. Thus, the tube may be swung through an arc to the extreme positions indicated by the letters A and B in FIGURE 2 and the letter C in FIGURE 4. As may be seen from the latter figure, the ends of the spring member 25 are extended to differing degrees as the sensing element and exit tube are moved. It should be noted that path between the source of illumination in the lamp housing 14 and the chamber 12 through tubular member 15 remains unobstructed.

Although I have described my invention with respect to the specific embodiment shown in the drawings and I have indicated certain other applications to which it may be put, it is understood that the present disclosure is by way of example only and that many useful embodiments of the invention are possible and many changes in detail of construction and arrangement of the parts may be made without departing from the scope and intent of the invention.

I claim:

1. A chamber for isolating a specimen from undesired environmental radiation comprising an enclosure including a substantially cylindrical side wall and top and bottom walls, said cylindrical side wall being provided with a slot extending around a substantial portion of the circumference thereof, a slidable member disposed over said slot in light tight relation therewith, said member being provided with an aperture of substantially lesser circumferential extent than said slot through which access may be had to the interior of said chamber, said slidable member being of greater extent than said slot and being slidable around the slotted portion of said chamber wall whereby access to said chamber may be had through said aperture over a substantial arc around said chamber without disturbing the light condition of said chamber.

2. In a chamber for isolating a specimen from undesired environmental radiation, said chamber being provided with a slot extending around a portion of the circumference thereof, means for sealing said slot against undesired radiation, said means comprising a band of material impervious to said undesired radiation disposed over said slot in radiation tight relation therewith, said band having an aperture therethrough extending over a relatively small arc of said circumference to provide access to the interior of said chamber and said band being movable around at least a major portion of the circumference of said chamber so that said access aperture may be disposed at selected points along the circumference of said chamber without disturbing the radiation tight condition of said chamber.

3. In a chamber for isolating a specimen from undesired environmental radiation, a substantially cylindrical wall for said chamber, said wall being provided with a slot extending around at least a portion of the circumference thereof, means for sealing said slot against undesired radiation, said means comprising a band of flexible material impervious to said undesired radiation slidably disposed in said slot, said slot being further formed with exit slits permitting the ends of said band to extend therethrough and away from said chamber wall, said band having an aperture therethrough and being movable around a portion of the circumference of said wall whereby said aperture is simultaneously moved to provide access to said chamber from a plurality of positions.

4. The device according to claim 3 wherein a tubular element is disposed in said aperture and secured to said band whereby said band is moved by means of said tubular element.

5. The device according to claim 4 wherein an opening is provided in said chamber wall intermediate said slits.

6. A chamber comprising a substantially cylindrical enclosure having a cylindrical wall and top and bottom walls, said cylindrical wall having a circumferentially extending opening therein and a tractable sliding mask covering said circumferential opening and adapted to be positioned over any portion of said circumferential opening, closing said circumferential opening, said chamber having an access aperture in said cylindrical wall thereof positioned between the ends of said circumferential opening and said tractable mask having an aperture positioned between the ends thereof whereby the chamber is provided with an access and egress aperture positionable with respect to each other over substantially more than 180°.

7. A chamber of the type described in claim 6 wherein the tractable mask member comprises a flexible spring steel member which fits into said U-shaped groove in said cylindrical wall.

8. A chamber of the character described comprising a substantially cylindrical enclosure having a cylindrical wall and top and bottom walls, said cylindrical wall having a circumferentially extending opening therein and a tractable sliding mask covering said circumferential opening and adapted to be positioned over any portion of said circumferential opening, closing said circumferential opening, said chamber having an access aperture in said cylindrical wall thereof positioned between the ends of said circumferential opening and said tractable mask having an aperture positioned between the ends thereof whereby the chamber is provided with an access and egress aperture positionable with respect to each other over substantially more than 180°, said tractable mask comprising a flexible spring steel member, the ends of which are bent sharply to act as a stop to prevent the ends of said flexible spring steel member from entering said slot and to assist in the guidance of said flexible spring steel member past any obstacle, the aperture in said mask being circumferentially smaller than the circumferential opening.

9. A chamber useful for making measurement where the surrounding environment and the environment within the chamber are mutually isolated comprising a substantially cylindrical enclosure, the cylindrical side wall being provided with an elongated substantially circumferential slot, the edges of said slot being provided with channels adapted to receive and guide the edges of a slidable tractable mask overlying said slot, said slot terminating in slit portions which permit said slidable tractable mask to depart from the circular path defined by the channeled edges of said elongated circumferential slot and be deflected away from said cylindrical wall of said chamber, said cylindrical wall having an access aperture therethrough located between the ends thereof, whereby said chamber may be provided with an access and an egress aperture positionable with respect to each other over substantially more than 270°.

References Cited in the file of this patent

UNITED STATES PATENTS

| | | |
|---|---|---|
| 770,763 | Lyhne et al. | Sept. 27, 1904 |
| 1,714,368 | Hobson | May 21, 1929 |
| 2,328,246 | Albion | Aug. 31, 1943 |
| 2,788,702 | Baum, Jr. | Apr. 16, 1957 |
| 2,873,644 | Kremen et al. | Feb. 17, 1959 |

OTHER REFERENCES

"An Easily Built Adjustable Slit," Masson, Sky and Telescope, March 1958, page 256.